United States Patent
Lindinger et al.

(10) Patent No.: US 8,223,810 B2
(45) Date of Patent: Jul. 17, 2012

(54) METHOD AND SYSTEM FOR GENERATING LASER PULSES

(75) Inventors: Albrecht Lindinger, Teltow (DE); Fabian Weise, Berlin (DE); Georg Achazi, Berlin (DE)

(73) Assignee: Freie Universitat Berlin, Berlin (DE)

( * ) Notice: Subject to any disclaimer, the term of this patent is extended or adjusted under 35 U.S.C. 154(b) by 99 days.

(21) Appl. No.: 12/801,323

(22) Filed: Jun. 3, 2010

(65) Prior Publication Data

US 2011/0299558 A1   Dec. 8, 2011

(51) Int. Cl.
*H01S 3/10* (2006.01)
(52) U.S. Cl. .......................................................... 372/25
(58) Field of Classification Search .................... 372/25
See application file for complete search history.

(56) References Cited

U.S. PATENT DOCUMENTS

| 5,975,697 A * | 11/1999 | Podoleanu et al. ........... 351/206 |
| 2008/0089698 A1 | 4/2008 | Jiang et al. |
| 2009/0285582 A1 * | 11/2009 | Miao et al. ..................... 398/147 |

OTHER PUBLICATIONS

Chang, C.-C., et al. "Dispersion-free fiber transmission for femtosecond pulses by use of a dispersion-compensating fiber and a programmable pulse shaper", Optics Letter, Feb. 15, 1998, vol. 23, No. 4, pp. 283-285.
International Search Report in PCT/EP2011/058326 dated Aug. 31, 2011.
Argawal, Govind P. "Nonlinear Fiber Optics" Academic Press, 1995, (table of contents only).
Bartelt, et al. "Optimal control of multi-photon dissociation and ionization processes in small $Na_mK_n$ clusters" Physical Chemistry Chemical Physics, 2004, vol. 6, pp. 1679-1686.
Bouwmans, et al "Properties of a hollow-core photonic bandgap fiber at 850 nm wavelength" Optics Express, Jul. 14, 2003, vol. 11, No. 14, pp. 1613-1620.
Brixner, et al "Femtosecond polarization pulse shaping" Optics Letters, Apr. 15, 2001, vol. 26, No. 8, pp. 557-559.
Brixner, et al "Quantum Control by Ultrafast Polarization Shaping", Physical Review Letters, 2004, vol. 92, No. 20, pp. 208301-1 to 208301-4.
Clark, et al. "Fiber delivery of femtosecond pulses from a Ti:sapphire laser" Optics Letters, Sep. 1, 2001, vol. 26, No. 17, pp. 1320-1322.
Condeelis, et al "Intravital Imaging of Cell Movement in Tumours" Nature Reviews, Dec. 2003, vol. 3, pp. 921-930.
Engelbrecht, et al "Ultra-compact fiber-optic two-photon microscope for functional fluorescence imaging in vivo" Optics Express, Apr. 14, 2008, vol. 16, No. 8, pp. 5556-5564.
Flusberg, et al "Fiber-optic fluorescence imaging" Nature Methods, Dec. 2005, vol. 2, No. 12, pp. 941-950.
Fu, et al. "Fibre-optic nonlinear optical microscopy and endoscopy" Journal of Microscopy, 2007, vol. 226, pp. 195-206.

(Continued)

*Primary Examiner* — Patrick Stafford
(74) *Attorney, Agent, or Firm* — Foley & Lardner LLP

(57) ABSTRACT

A method of generating laser pulses having a predefined amplitude, phase and/or polarization at a distal end of an optical transmission system having at least one optical fiber, includes the steps of: generating laser pulses and inputting the laser pulses into a pulse shaper; calculating a control signal for controlling the pulse shaper, wherein at least one physical parameter of the optical fiber is taken into account; applying the control signal to the pulse shaper and modulating the amplitude, phase and/or polarization of the laser pulses whereby modulated laser pulses are formed; and inputting the modulated laser pulses into a proximal end of the optical transmission system.

17 Claims, 10 Drawing Sheets

OTHER PUBLICATIONS

Göbel, et al. "Distortion-free delivery of nanojoule femtosecond pulses from a Ti:sapphire laser through a hollow-core photonic crystal fiber" Optics Letters, Jun. 1, 2004, vol. 29, No. 11, pp. 1285-1287.

Gordon, et al "PMD fundamentals: Polarization mode dispersion in optical fibers" PNAS, Apr. 25, 2000, vol. 97, No. 9, pp. 4541-4550.

Goswami, et al "Optical pulse shaping approaches to coherent control" Physics Reports, 2003, vol. 374, pp. 385-481.

Hurwitz, et al "A New Calculus for the Treatment of Optical Systems" National Scholar, Jul. 1941, vol. 31, pp. 493-499.

Judson, et al. "Teaching Lasers to Control Molecules" Physical Review Letters, Mar. 9, 1992, vol. 68, No. 10, pp. 1500-1503.

Larson, et al. "Delivery of sub-10-fs pulses for nonlinear optical microscopy by polarization-maintaining single mode optical fiber" Optics Express, Sep. 15, 2008, vol. 16, No. 19, pp. 14723-14730.

Lee, et al "Adaptive dispers on compensation for remote fiber delivery of near-infrared femtosecond pulses" Optics Letters, Nov. 15, 2004, vol. 29, No. 22, pp. 2602-2604.

Miao, et al. "Broadband all-order polarization mode dispersion compensation via wavelength-by-wavelength Jones matrix correction" Optics Letters, Aug. 15, 2007, vol. 32, No. 16, pp. 2360-2362.

Nelson, et al. "Programmable polarization-independent spectral phase compensation and pulse shaping" Optics Express, Jul. 28, 2003, vol. 11, No. 15, pp. 1763-1769.

Nicole, et al. "Competition of different ionization pathways in $K_2$ studied by ultrafast pump-probe spectroscopy: A comparison between theory and experiment" Journal of Chemical Physics, Nov. 1, 1999, vol. 111, No. 17, pp. 7857-7864.

Nuernberger, et al. "Femtosecond quantum control of molecular dynamics in the condensed phase" Physical Chemistry Chemical Physics, 2007, vol. 9, pp. 2470-2497.

Ouzounov, et al. "Generation of Megawatt Optical Solitions in Hollow-Core Photonic Band-Gap Fibers" Science, Sep. 19, 2003, vol. 301, pp. 1702-1704.

Plewicki, et al "Independent control over the amplitude, phase, and polarization of femtosecond pulses" Applied Physics, 2007, vol. 86, pp. 259-263.

Plewicki, et al. "Phase, amplitude, and polarization shaping with a pulse shaper in a Mach-Zehnder interferometer" Applied Optics, Nov. 16, 2006, vol. 45, No. 32, pp. 8354-8359.

Polachek, et al. "Full control of spectral polarization of ultrashort pulses" Optics Letters, Mar. 1, 2006, vol. 31, No. 5, pp. 631-633.

Rand, et al "Observation of Temporal Vector Soliton Propagation and Collision in Birefringent Fiber" The American Physical Society, 2007, vol. 98, pp. 053902-1 to 053902-4.

Russell, et al. "Photonic Crystal Fibers" Science, 2003, vol. 299, pp. 358.

Rutz, et al. "Femtosecond wave-packet propagation in spin-orbit-coupled electronic states of $^{39,39}K_2$ and $^{39,41}K_2$" Physical Review, Jul. 1996, vol. 54, No. 1, pp. 306-313.

Suzuki, et al. "Optimal Control of Multiphoton Ionization Process in Aligned $I_2$ Molecules with Time-Dependent Polarization Pulses" Physical Review Letters, 2004, vol. 92, No. 13, pp. 133005-1 to 133005-4.

Tai, et al. "Two-photon fluorescence microscope with a hollow-core photonic crystal fiber" Optics Express, 2004, vol. 12, p. 6122.

Talukder, et al. "Propagation of arbitrarily shaped femtosecond laser pulses through a photonic crystal fiber" Applied Physics Letters, 2006, vol. 89, pp. 054103-1 to 054103-3.

Urbanczyk, et al. "Dispersion effects in elliptical-core highly birefringent fibers" Applied Optics, Apr. 29, 2001, vol. 40, No. 12, pp. 1911-1920.

Weber, et al "Interferometric generation of parametrically shaped polarization pulses" Applied Optics, Aug. 10, 2007, vol. 46, No. 23, pp. 5987-5990.

Weber, et al. "Parametric polarization pulse shaping demonstrated for optimal control of NaK" The Journal of Chemcial Phsycis, 2008, vol. 28, pp. 174306-1 to 174306-4.

Weiner, et al. "Programmable femtosecond pulse shaping by use of a multielement liquid-crystal phase modulator" Optics Letters, Mar. 15, 1990, vol. 15, No. 6, pp. 326-328.

Weiner, et al. "Programmable Shaping of Femtosecond Optical Pulses by Use of 128-Element Liquid Crystal Phase Modulator" Journal of Quantum Electronics, Apr. 1992, vol. 28, No. 4, pp. 908-920.

Weise, et al "Application of phase, amplitude, and polarization shaped pulses for optimal control on molecules" Chemical Physics, 2007, vol. 332, pp. 313-317.

Weise, et al "Full control over the electric field using four liquid crystal arrays" Optics Letters, Apr. 15, 2009, vol. 34, No. 8, pp. 1258-1260.

* cited by examiner

METHOD AND SYSTEM FOR GENERATING LASER PULSES

BACKGROUND OF THE INVENTION

The invention relates to a method and system for generating laser pulses having a predefined amplitude, phase or polarization.

The invention of femtosecond lasers and the development of pulse shaping techniques opened the wide field of coherent control [1, 2]. The implementation of a pulse shaper into a feedback loop makes it possible to find the optimal pulse form for the investigated system without having any knowledge about the underlying physics [3]. By analyzing the obtained pulse shapes, the excitation process can be revealed. This powerful method was applied to many successful experiments in different fields [4]. In these experiments, the pulses were modulated in phase and/or amplitude. Since the majority of quantum systems are three dimensional, the vectorial component of the electrical field, the polarization, has to be considered additionally. Pulse shapers which are capable of polarization shaping were developed. The first attempts at polarization shaping employed standard double liquid crystal arrays which have their optical axes oriented at ±45° in the Fourier plane of a 4-f line [5]. The experimental implementation of this setup in a closed-loop experiment on optimizing the ionization of $K_2$ and $I_2$ showed nicely the relevance of the vectorial character of the light [6, 7]. Yet, in this setup the polarization control is limited to ellipses with fixed orientation. This limitation was overcome by additionally passing an array with its optical axis parallel to the input polarization in an 8-f geometry [8]. A four-array modulator was used to correct the polarization mode dispersion in optical fibers [9]. However, all these setups are not able to modulate the amplitude of the laser pulse. By passing through several liquid crystal arrays with appropriately aligned optical axes, the amplitude of the laser pulse is additionally shaped [10].

OBJECTIVE OF THE PRESENT INVENTION

An objective of the present invention is to provide a method and system for generating laser pulses which have a predefined amplitude, phase or polarization at a distal end of an optical transmission system.

BRIEF SUMMARY OF THE INVENTION

An embodiment of the invention relates to a method of generating laser pulses having a predefined amplitude, phase or polarization at a distal end of an optical transmission system, which comprises at least one optical fiber, the method comprising the steps of: generating laser pulses and inputting the laser pulses into a pulse shaper; calculating a control signal for controlling the pulse shaper, wherein at least one physical parameter of the optical fiber is taken into account; applying the control signal to the pulse shaper and modulating the amplitude, phase or polarization of the laser pulses whereby modulated laser pulses are formed; and inputting the modulated laser pulses into a proximal end of the optical transmission system.

Preferably, the amplitude, phase and polarization of the laser pulses are modulated.

According to a first preferred embodiment, the step of calculating the control signal takes the predefined amplitude at the distal end of the optical transmission system into account.

According to a second preferred embodiment, the step of calculating the control signal takes the predefined phase at the distal end of the optical transmission system into account.

According to a third preferred embodiment, the step of calculating the control signal takes the predefined polarization at the distal end of the optical transmission system into account.

According to a fourth preferred embodiment, the step of calculating the control signal takes the predefined amplitude and the predefined phase at the distal end of the optical transmission system into account.

According to a fifth preferred embodiment, the step of calculating the control signal takes the predefined amplitude and the predefined polarization at the distal end of the optical transmission system into account.

According to a sixth preferred embodiment, the step of calculating the control signal takes the predefined phase and the predefined polarization at the distal end of the optical transmission system into account.

According to a seventh preferred embodiment, the step of calculating the control signal takes the predefined amplitude, the predefined phase and the predefined polarization at the distal end of the optical transmission system into account.

Additionally or alternatively, the step of calculating the control signal may also take parameters into account which describe the shaping behavior of the pulse shaper.

Furthermore, the step of calculating the control signal may take the amplitude, the phase and/or the polarization of the optical laser pulses, which are inputted into the pulse shaper, into account.

Further, a systematic modification of at least one predetermined laser pulse parameter may be conducted.

The method as described above may be used to generate a predetermined sub pulse sequence in amplitude, phase and/or polarization. The term sub pulse refers to short pulses which together form a resulting pulse.

The step of calculating the control signal is preferably adapted to an optical fiber with randomly directed birefringence along its dimension, if the optical transmission system comprises such a fiber.

The step of calculating the control signal is preferably adapted to an inherently birefringent optical fiber, if the optical transmission system comprises such a fiber.

The step of calculating the control signal is preferably adapted to an optical fiber exhibiting randomly directed birefringence along its dimension if the optical transmission system comprises such a fiber.

The step of calculating the control signal may further take an amplitude value, a phase value and/or a polarization value referring to the current amplitude, phase and/or polarization at the distal end of the optical transmission system, into account.

The step of calculating the control signal may include an iterative algorithm for reducing the difference between the predefined amplitude and the amplitude value, the difference between the predefined phase and the phase value and/or the difference between the predefined polarization and the polarization value. For instance an evolutionary algorithm may be applied.

Another embodiment may comprise the steps of: reflecting at least a part of the laser pulse energy from the distal end of the optical transmission system back to the proximal end of the optical transmission system; measuring the reflected laser pulses at the proximal end; and calculating the amplitude value, the phase value and/or the polarization value referring to the distal end, based on the measured reflected laser pulses at the proximal end.

As mentioned above, the optical transmission system comprises at least one optical fiber. As such, the laser pulses may be inputted into the proximal end of the fiber and transmitted from the proximal end to the distal end of the optical transmission system via said fiber. The reflected pulses may be transmitted from the distal end of the optical transmission system to the proximal end of the optical transmission system via the same fiber or any other light guiding device.

For instance, the optical transmission system may comprise at least two fibers, hereinafter referred to as first and second fibers, which both connect the proximal and distal ends of the optical transmission system. In this case, the laser pulses may be inputted into the proximal end of a first fiber of the optical transmission system, and the reflected pulses may be transmitted from the distal end to the proximal end of the optical transmission system via the second fiber.

Modifications of the fiber parameters during operation (due to bending, twisting, temperature changes, etc.) can be precompensated, e.g. by utilizing the above described pulse detection method and adapting the input parameters for the pulse forming unit.

The optical transmission system may also comprise at least one nonlinear element, which modifies or multiplies the optical frequency of the laser pulses. In this case, the step of calculating the control signal preferably takes parameters that describe the behavior of the at least one nonlinear element into account.

The predefined amplitude, phase, and/or polarization values may be included into an iterative algorithm. E.g., said iterative algorithm may be an evolutionary algorithm.

The method as described above may be used for generating short, preferably ultra short laser pulses, such as femtosecond laser pulses, for medical applications. For instance, the pulses may be transferred into a human or animal body for examination or treatment.

The invention also relates to a system for generating laser pulses having a predefined amplitude, phase and/or polarization, the system comprising a pulse shaper for modulating the amplitude, phase or polarization of incoming laser pulses and for forming modulated laser pulses; an optical transmission system connected to the pulse shaper, said optical transmission system comprising at least one optical fiber, a control unit having a calculating module for providing a control signal to control the pulse shaper, wherein said calculation module is adapted to take at least one physical parameter of the optical fiber into account, and to generate a control signal which at least approximately leads to the predefined amplitude, phase or polarization at the distal end of the optical transmission system.

According to a preferred embodiment, the pulse shaper comprises at least one liquid crystal array in the spectrally dispersed laser beam path.

According to a preferred embodiment the pulse shaper comprises at least two liquid crystal arrays which are arranged such that said laser pulses pass the liquid crystal arrays near the Fourier plane.

Preferably, the pulse shaper comprises at least three liquid crystal arrays which are arranged such that said laser pulses pass the liquid crystal arrays spectrally dispersed, wherein at least one polarizer is arranged between two of those liquid crystal arrays.

Preferably, the pulse shaper comprises at least four liquid crystal arrays which are arranged such that said laser pulses pass the liquid crystal arrays spectrally dispersed, wherein at least one polarizer is arranged between two of those liquid crystal arrays.

The optical transmission system preferably includes at least one step index optical fiber for transmitting the laser pulses and/or the reflected laser pulses.

The optical transmission system preferably includes at least one photonic crystal hollow-core fiber for transmitting the laser pulses and/or the reflected laser pulses.

The optical transmission system may form or be a part of a medical device such as an endoscopic device. As such, the invention also relates to a medical device having an optical transmission system as described above.

The invention also relates to a computer program product, stored on a computer readable medium, comprising instructions for configuring a computer to calculate a control signal for controlling a pulse shaper according to the method as described above.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENT

The preferred embodiment of the present invention will be best understood by reference to the drawings, wherein identical or comparable parts are designated by the same reference signs throughout.

It will be readily understood that the present invention, as generally described and illustrated in the figures herein, could vary in a wide range. Thus, the following more detailed description of the exemplary embodiments of the present invention, as represented in FIGS. 1-7, is not intended to limit the scope of the invention, as claimed, but is merely representative of presently preferred embodiments of the invention.

Figure 1:
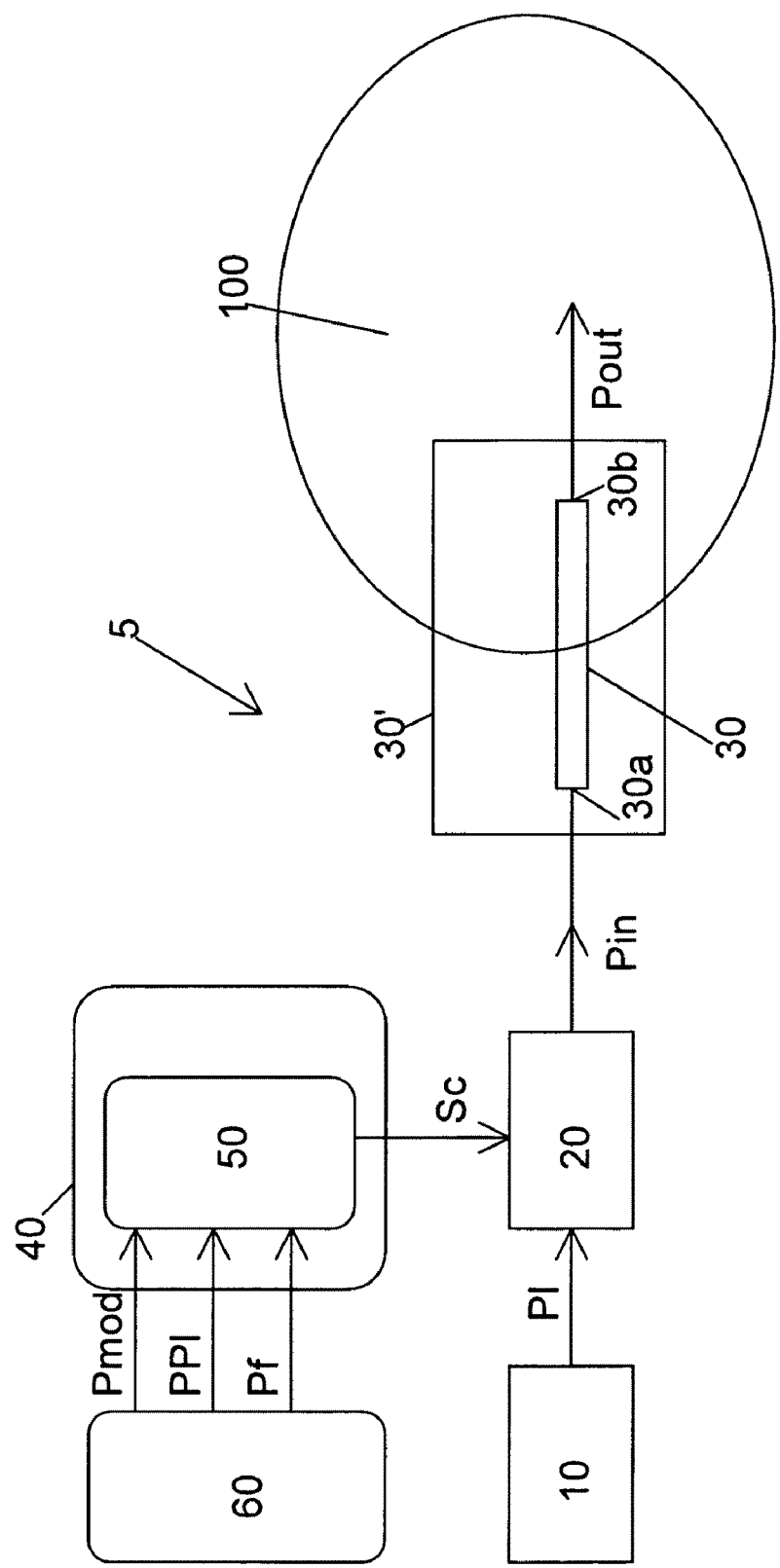
FIG. 1 shows a first exemplary embodiment of an inventive system.

FIG. 1 shows an exemplary embodiment of a system 5 for generating laser pulses Pout. The system comprises a laser 10 capable of providing femtosecond laser pulses P1, a pulse shaper 20, and an optical fiber 30 which forms a transmission system 30'. The optical fiber 30 may be a hollow-core fiber.

The optical fiber 30 comprises a proximal end 30a, which is connected to the pulse shaper 20, and a distal end 30b where the transmitted laser pulses Pout exit the optical fiber 30.

The pulse shaper 20 is controlled by a control unit 40 which includes a calculating module 50. The calculating module 50 provides a control signal Sc to control the pulse shaper 20.

The calculation module 50 anticipates the behavior of the transmission system 30', i.e. the behavior of the hollow-core fiber 30, and calculates the control signal Sc such that the transmitted laser pulses Pout at least approximately have a predefined amplitude, phase and/or polarization at the distal end 30b of the optical fiber 30. For this calculation, the calculation module 50 preferably takes one or more of the following parameters into account:

pulse parameters PP1 describing the amplitude, phase and/or polarization of the laser pulses P1 which are generated by laser 10 and inputted into pulse shaper 20;

parameters Pmod, which describe the behavior of the pulse shaper 20 with respect to changes of amplitude, phase and/or polarization of the laser pulses P1 as a function of the control signal Sc; and physical parameters Pf of the optical fiber 30, such as length, attenuation, dispersion, birefringence etc.

Parameters PP1, Pmod and Pf may have been measured beforehand and stored in a storage 60 which is connected to calculation module 50. Based on the parameters, the calculation module 50 may simulate the optical transmission of laser pulses P1 through the entire system 5, including the optical fiber 5, and thus predict the amplitude, phase, polarization and/or shape of the laser pulses Pout at the distal end 30b of fiber 30 as a function of the control signal Sc.

The system shown in FIG. 1 may be used to generate ultra short pulses Pout with a predefined amplitude, phase and/or polarization at the distal end 30b of the fiber 30. The system 5 may be used for medical applications. For instance, the distal end 30b of fiber 30 may be introduced into a human or animal body 100 for endoscopic examination or treatment. In other words, system 5 may form or be a part of a medical device such as an endoscopic device.

Figure 2:
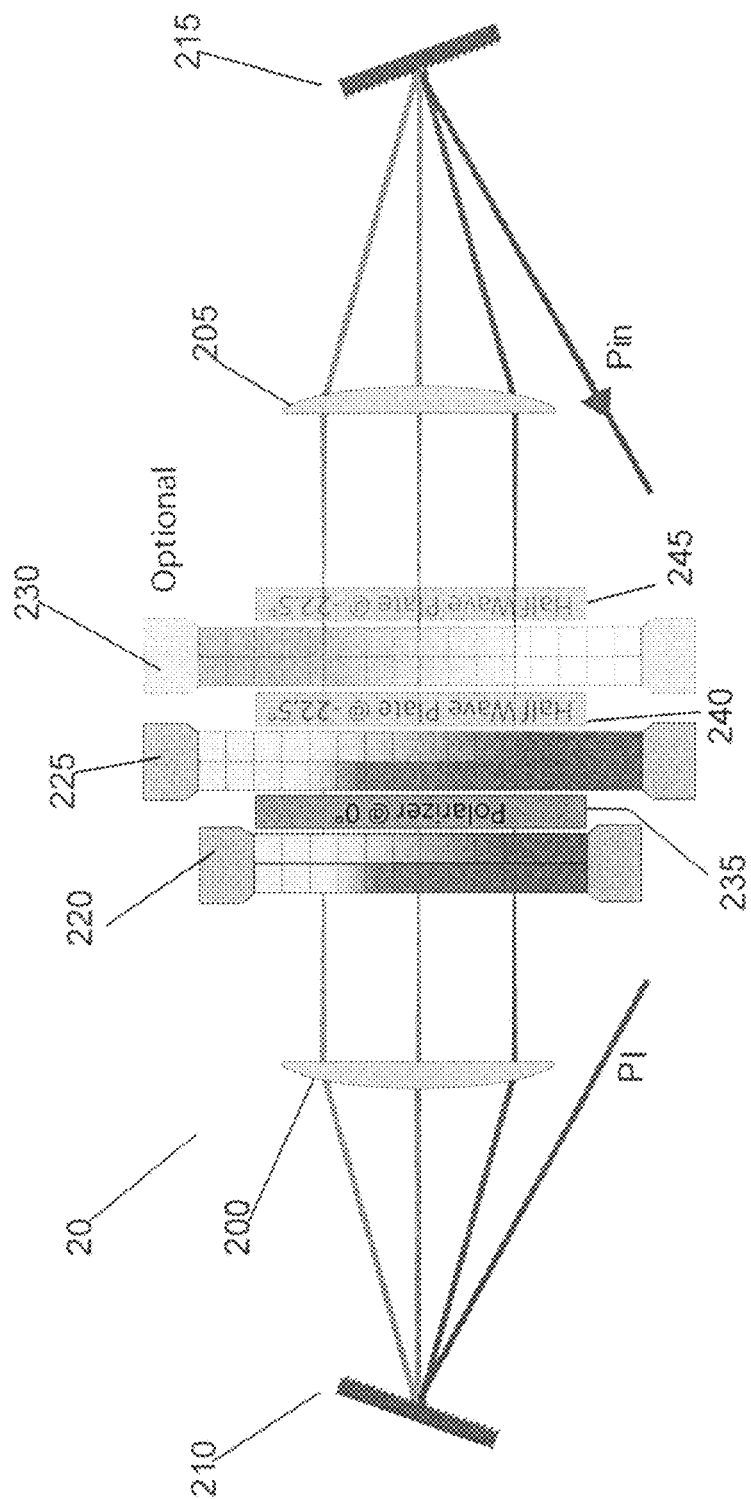
FIG. 2 shows an exemplary embodiment of a pulse shaper which may be incorporated in the system of FIG. 1.

FIG. 2 shows an exemplary embodiment of the internal components of pulse shaper 20. The pulse shaper 20 comprises two cylindrical lenses 200 and 205 with a focal length of for example 200 mm and two gratings 210 and 215 with for example 1200 grooves/mm which could have a polarization-dependent difference in reflectivity for horizontally and vertically polarized light.

The pulse shaper 20 further comprises three standard double liquid crystal modulators 220, 225 and 230 (e.g., 2×SLM1280 and SLM-256, CRi) having their optical axes oriented at ±45°, a polarizer 235, and two wave plates 240 and 245. Each modulator is preferably mounted on a high-precision stage to coordinate the pixel assignment and adjust them to match the same frequency band $\omega n$. The wavelength calibration coefficient for the arrays may amount to 0.3415 nm/pixel. The laser pulses are preferably modulated in the Fourier plane of a 4-f line.

Figure 3:
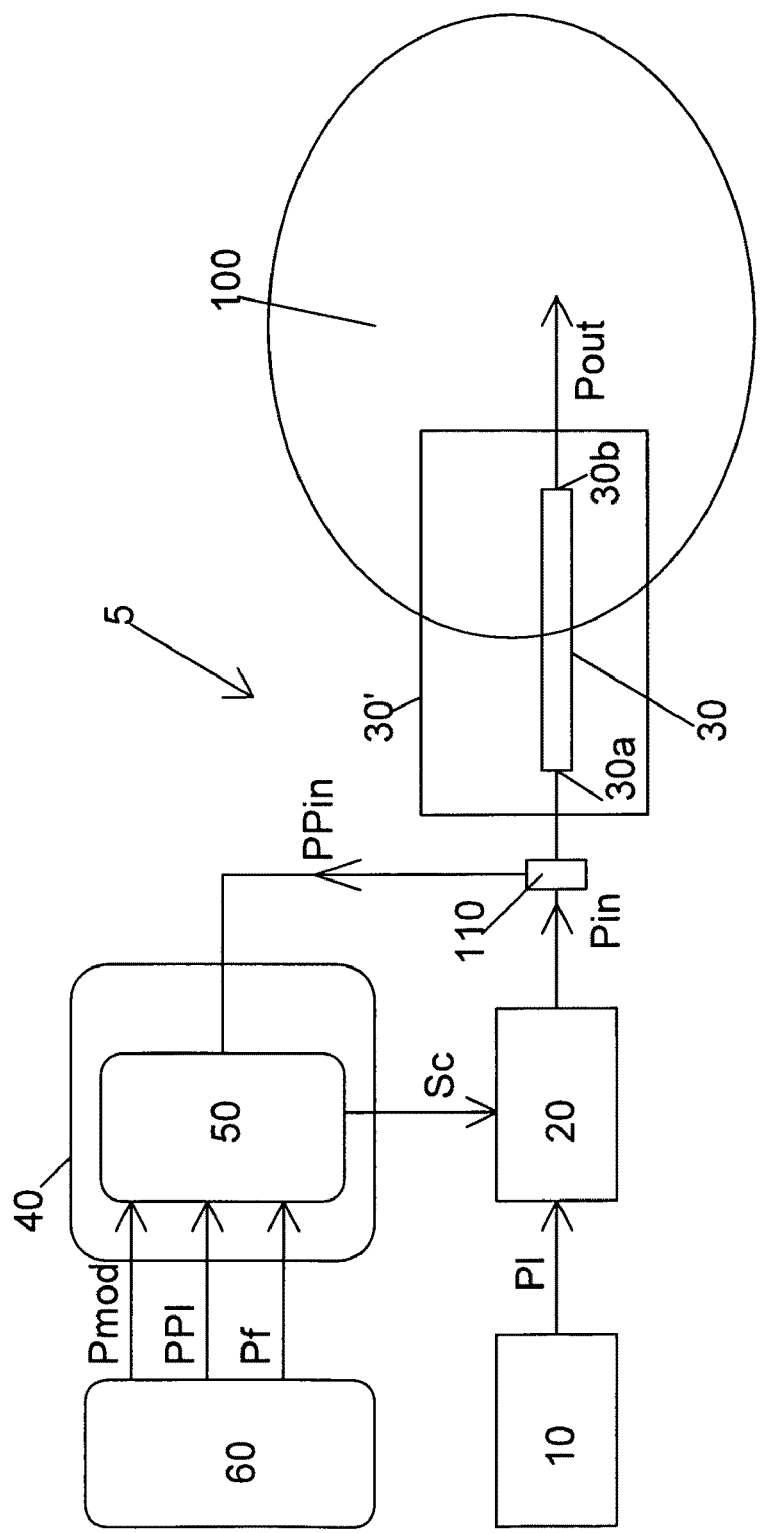
FIG. 3 shows a second exemplary embodiment of an inventive system having a pulse shape measuring unit between a pulse shaper and the proximal end of an optical fiber.

FIG. 3 shows a second exemplary embodiment of a system 5 for generating laser pulses Pout. In addition to the components discussed with regard to the embodiment shown in FIG. 1, the system of FIG. 3 further comprises a pulse shape measuring unit 110 which is capable of measuring the amplitude, phase, polarization and/or shape of the modulated laser pulses Pin, which exit pulse shaper 20 and enter the optical fiber 30.

The pulse shape measuring unit 110 generates parameters PPin which are inputted into the calculation unit 50. As such, calculation unit 50 may use one or more of the following parameters for calculating the most appropriate control signal Sc:

pulse parameters PP1 describing the amplitude, phase and/or polarization of the laser pulses P1 which are generated by laser 10 and inputted into the pulse shaper 20;

parameters Pmod which describe the behavior of the pulse shaper 20 with respect to changes of amplitude, phase and/or polarization of the laser pulses P1 as a function of the control signal Sc;

physical parameters Pf of the optical fiber 30, such as length, attenuation, dispersion, birefringence etc; and measured parameters PPin of the laser pulses Pin before entering the optical fiber 30.

Figure 3B:
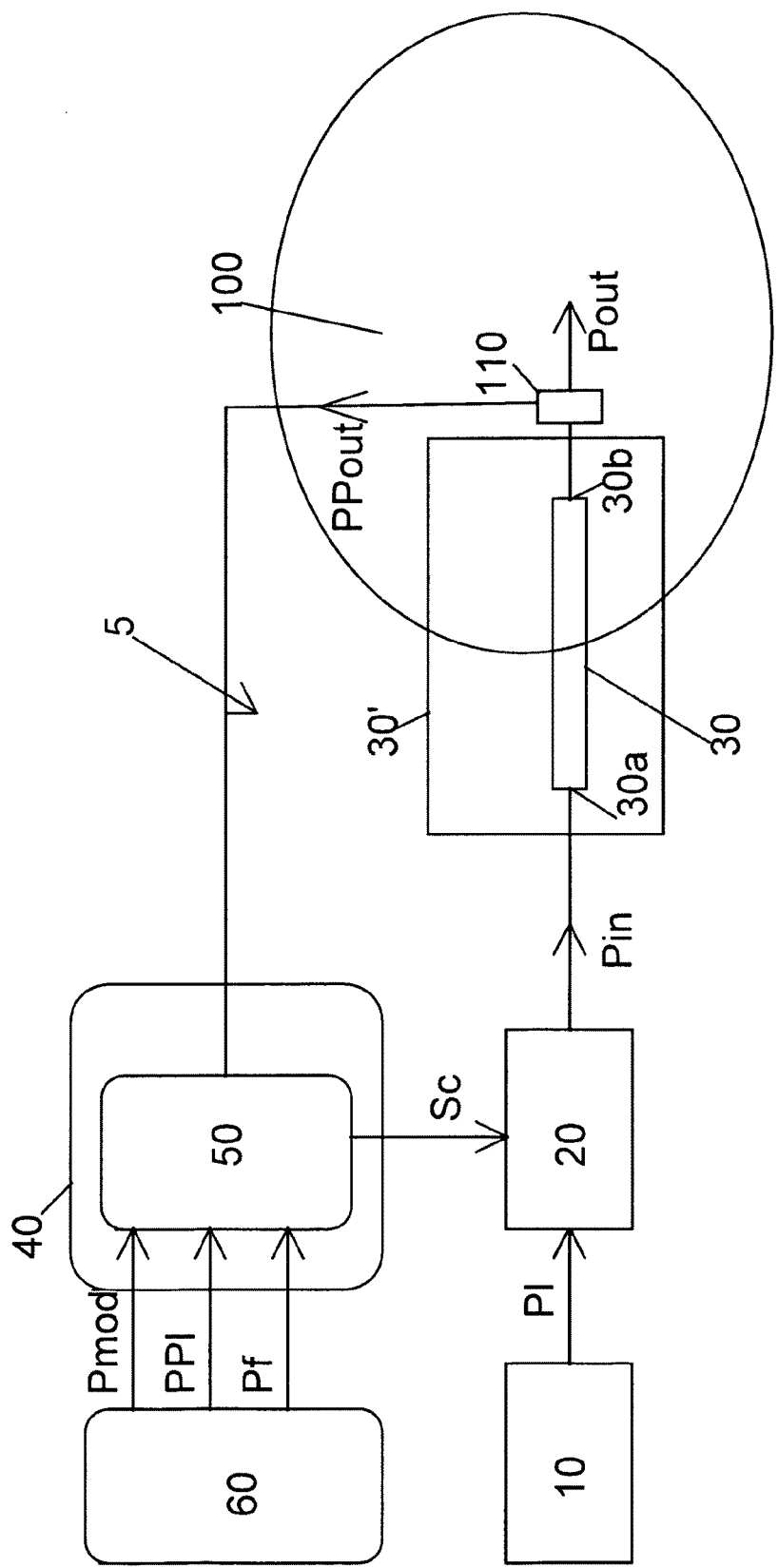
FIG. 3b shows a third exemplary embodiment of an inventive system having a pulse shape measuring unit at the proximal end of an optical fiber.

FIG. 3b shows a third exemplary embodiment of a system 5 for generating laser pulses Pout. In addition to the components discussed with regard to the embodiment shown in FIG. 1, the system of FIG. 3b further comprises a pulse shape measuring unit 110 at the distal end of the optical fiber.

Figure 3C:
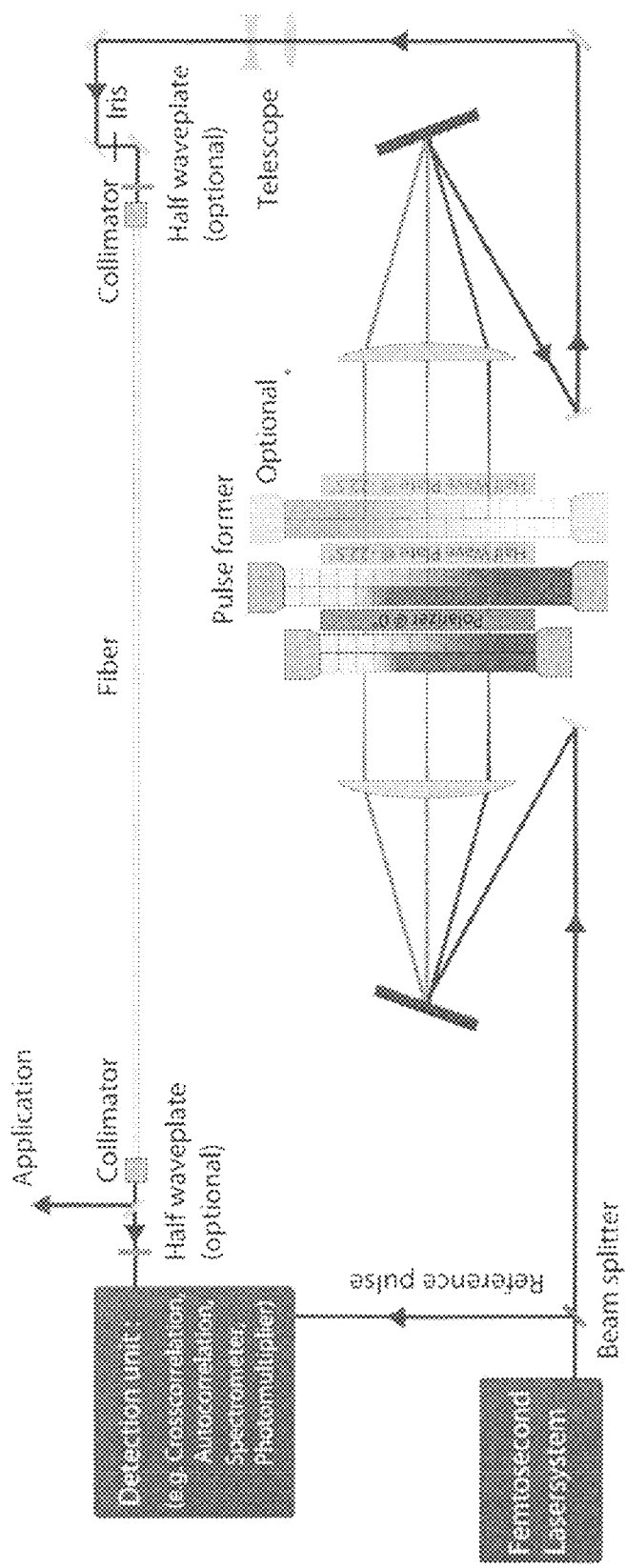
FIG. 3c shows a preferred experimental system including pulse-former and optics having a pulse shape measuring unit at the proximal end of an optical fiber.

FIG. 3c shows a schematic apparative setup of the third exemplary embodiment of a system 5 for generating laser pulses Pout including the preferred pulse-former design and optical components. The system of FIG. 3c comprises a pulse shape measuring unit at the distal end of the optical fiber.

Figure 4:
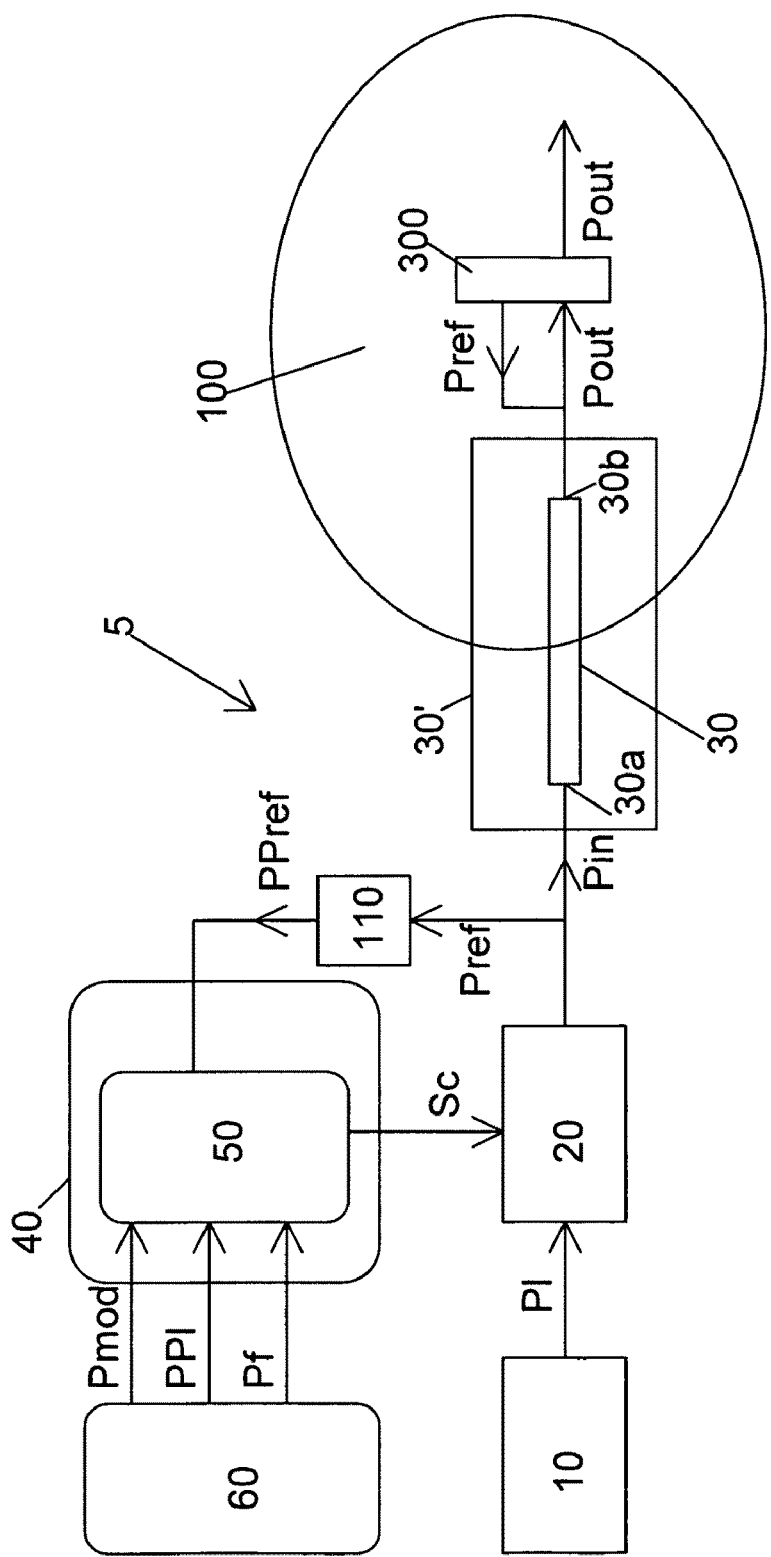
FIG. 4 shows a fourth exemplary embodiment of an inventive system having a reflection unit which reflects pulse energy from the distal end of an optical transmission system back to the proximal end, wherein the transmission system comprises a single optical fiber.

FIG. 4 shows a fourth exemplary embodiment of a system 5 for generating laser pulses. In addition to the components discussed with regard to the embodiment shown in FIG. 1, the system of FIG. 4 further comprises a reflection unit 300 which reflects a part of the energy of the laser pulses Pout back to the proximal end 30a of the optical fiber 30.

The reflected laser pulses Pref are measured by a pulse shape measuring unit 110 which is capable of measuring the amplitude, phase, polarization and/or shape of the reflected laser pulses Pref, which exit the proximal end 30a. The pulse shape measuring unit 110 generates parameters PPref which are inputted into the calculation unit 50. As such, calculation unit 50 may use one or more of the following parameters for calculating the most appropriate control signal Sc:

pulse parameters PP1 describing the amplitude, phase and/or polarization of the laser pulses P1 which are generated by laser 10 and inputted into the pulse shaper 20;

parameters Pmod which describe the behavior of the pulse shaper 20 with respect to changes of amplitude, phase and/or polarization of the laser pulses P1 as a function of the control signal Sc;

physical parameters Pf of the optical fiber 30, such as length, attenuation, dispersion, birefringence etc; and measured parameters PPref of the reflected laser pulses which have passed the optical fiber 30 twice.

Figure 4B:
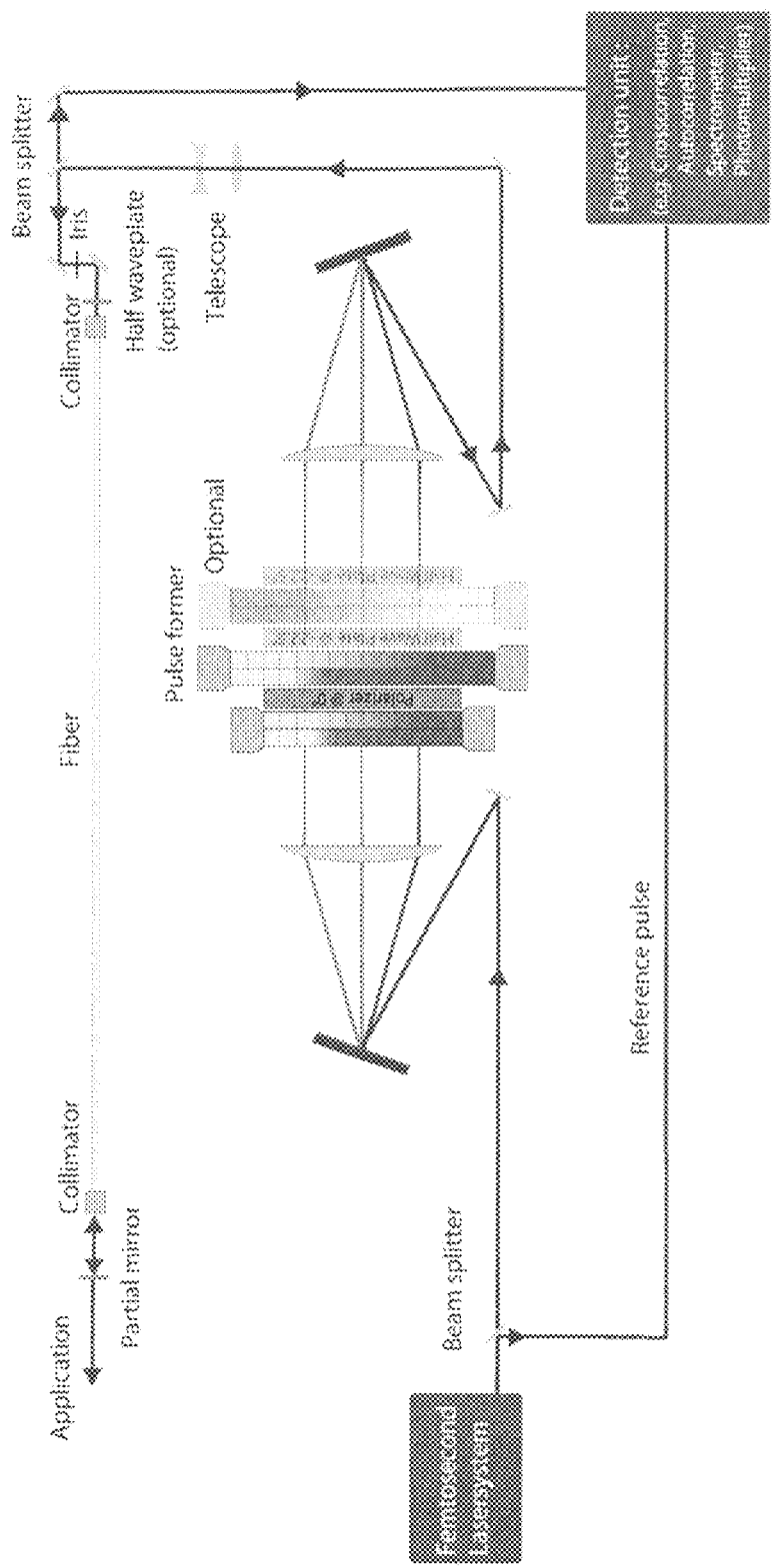
FIG. 4b shows a preferred experimental system including pulse-former and optics having a reflection unit which reflects pulse energy from the distal end of an optical transmission system back to the proximal end, wherein the transmission system comprises a single optical fiber.

FIG. 4b shows a schematic apparative setup of the fourth exemplary embodiment of a system 5 for generating laser pulses Pout including a reflection unit at the distal end of the optical transmission system and a pulse shape measuring unit at the proximal end of the optical transmission system for detection of the reflective laser pulses.

Figure 5:
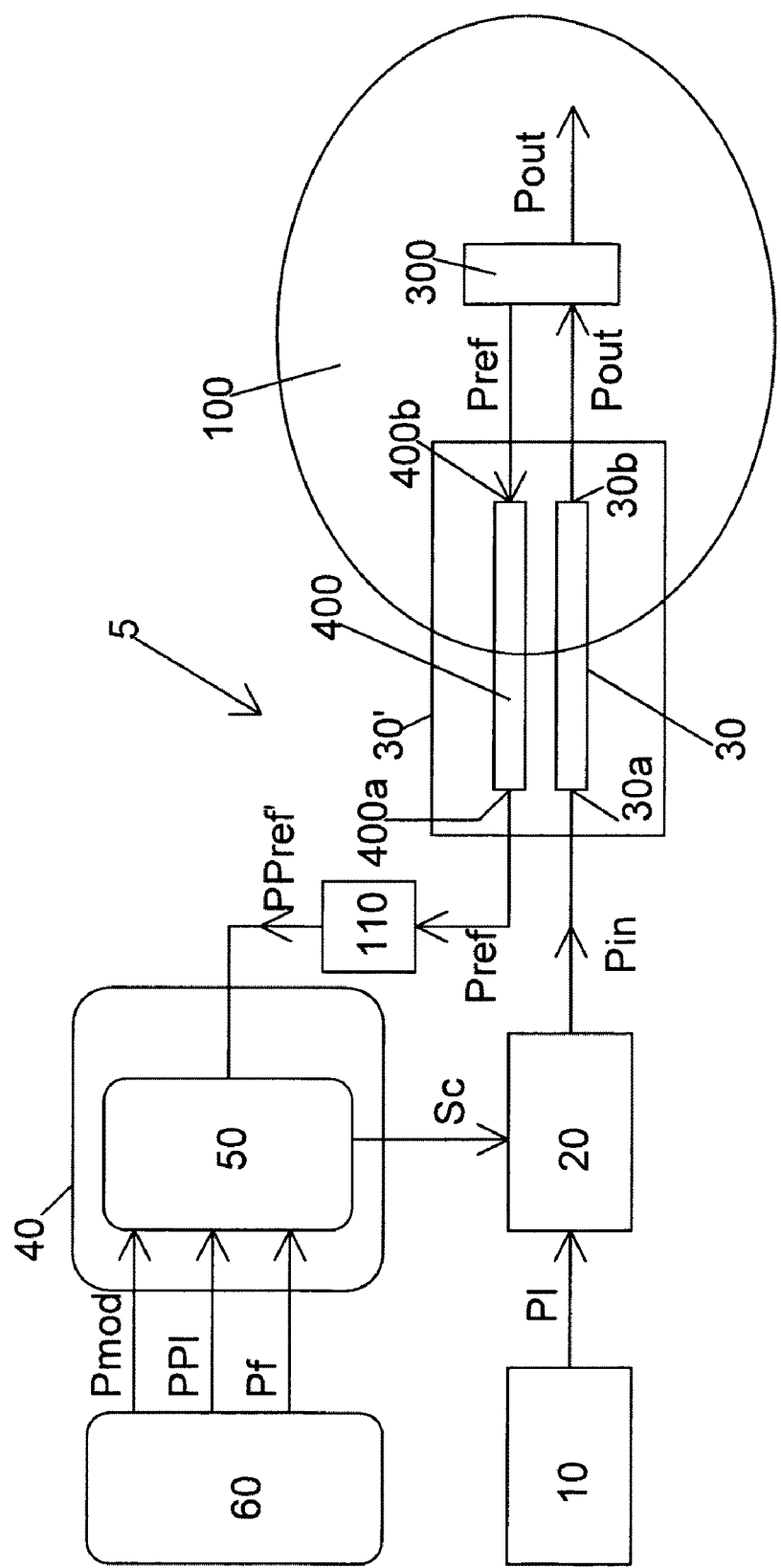
FIG. 5 shows a fifth exemplary embodiment of an inventive system having a reflection unit which reflects pulse energy from the distal end of an optical transmission system back to the proximal end, wherein the transmission system comprises two separate optical fibers.

FIG. 5 shows a fifth exemplary embodiment of a system 5 for generating laser pulses. The transmission system 30' includes a second optical fiber 400 which may be identical with fiber 30 or differ from fiber 30. The reflection unit 300 is connected to the distal end of both fibers 30 and 400 and inputs a part of the energy of laser pulses Pout into the distal end 400b of fiber 400 for transmitting them to the shape measuring unit 110.

The reflected pulses Pref are measured by the pulse shape measuring unit 110 which is capable of measuring the amplitude, phase, polarization and/or shape of the reflected laser pulses Pref, which exit the proximal end 400a of fiber 400. The pulse shape measuring unit 110 generates parameters PPref' which are inputted into the calculation unit 50. As such, calculation unit 50 may use one or more of the following parameters for calculating the most appropriate control signal Sc:

pulse parameters PP1 describing the amplitude, phase and/or polarization of the laser pulses P1 which are generated by laser 10 and inputted into the pulse shaper 20;

parameters Pmod which describe the behavior of the pulse shaper 20 with respect to changes of amplitude, phase and/or polarization of the laser pulses P1 as a function of the control signal Sc;

physical parameters Pf of the optical fiber 30, such as length, attenuation, birefringence etc; and measured parameters PPref' of the reflected laser pulses which have passed both optical fibers 30 and 400 once.

Modifications of the fiber parameters during operation due to possible bending or twisting of the fiber can be precompensated on-line, e.g. by utilizing the above described reflective pulse detection method for fast adaption of the input parameters (PPin) for the pulse forming unit.

Figure 6:
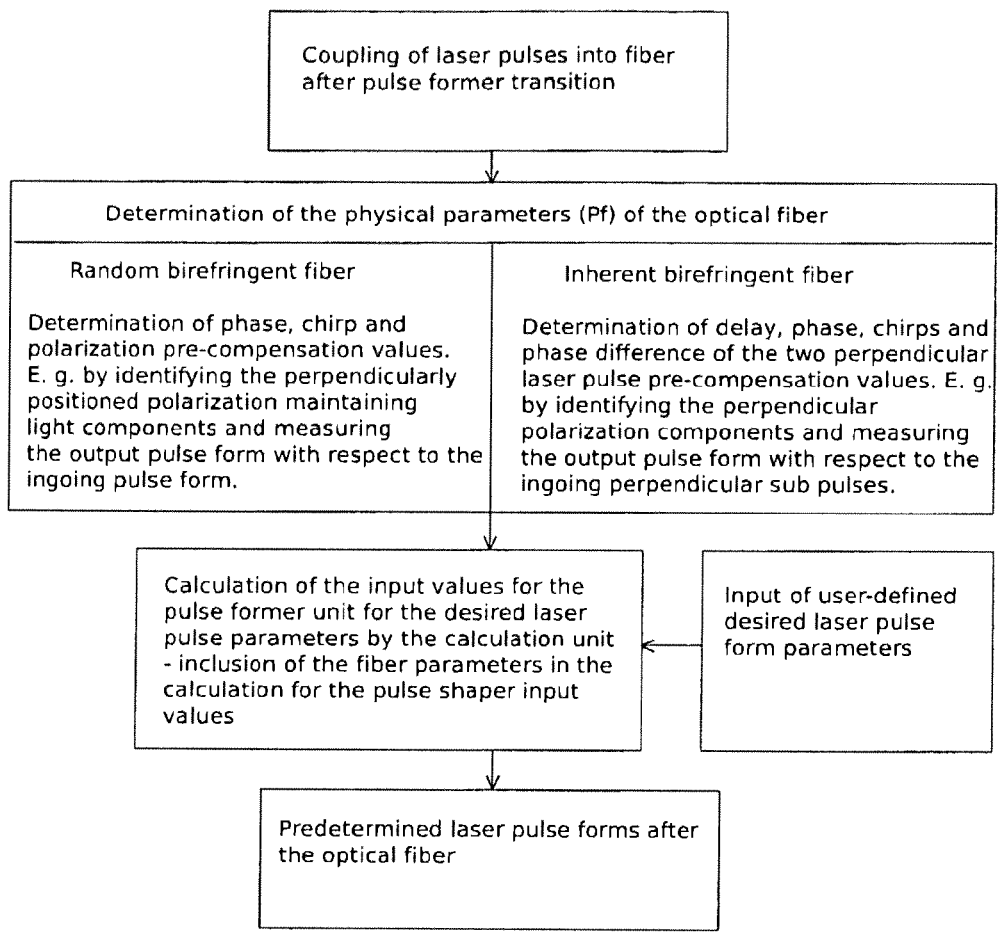
FIG. 6 shows a block diagram of the inventive pulse forming method for generating predetermined laser pulses after an optical fiber.

The preferred embodiment of the inventive pulse forming method for generating predetermined laser pulses after an optical fiber comprises the following steps (see block diagram in FIG. 6).

Coupling of laser pulses into the fiber after the pulse forming transition.

Determination of the physical parameters (Pf) of the optical fiber

In the case of a random birefringent fiber determination of phase, chirp and polarization pre-compensation values. E.g. by identifying the perpendicularly positioned polarization maintaining light components and measuring the output pulse form with respect to the ingoing pulse form.

In the case of an inherent birefringent fiber determination of delay, phases, chirps and phase difference of the two perpendicular laser pulse pre-compensation values. E.g. by identifying the perpendicular polarization component axes and measuring the output pulse form with respect to the ingoing perpendicular sub pulses on the axes.

In both cases the polarization ellipse can favorably be turned, e.g. by utilizing the polarization control feasibilities of the unrestricted pulse-former setup, such that their principal axes match the ingoing perpendicular polarization component axes of the fiber.

Input of user-defined desired laser pulse form parameters

Calculation of the input values for the pulse-former unit for the desired laser pulse parameters by the calculation unit 50. Inclusion of the fiber parameters Pf in the calculation for the pulse shaper input values Receiving the predetermined laser pulse forms after the optical transmission system In order to calculate the control signal Sc, the calculation unit 50 may carry out the following main steps:

calculation of the input values for the pulse-former unit for the desired laser pulse parameters without optical fiber inclusion of the parameters, which describe the optical fiber properties, in the calculation for the pulse shaper input values These steps may as well be combined in a single calculation.

The calculation steps are described in more detail as follows. All mentioned electric field components, fiber parameters and phase retardances will be regarded as frequency dependent which will not be assigned separately (e.g. $E \equiv E_\omega$, $\phi \equiv \phi_\omega$).

Calculation of the pulse-former parameters for the desired laser pulse parameters without optical fiber:

In the restricted case of having at least three liquid crystal arrays and a polarizer in between such that only one liquid crystal array (or only liquid crystal arrays with perpendicularly positioned optical axes) are located after the polarizer only polarization ellipses with horizontal and vertical principal axes are possible. In such a case, e.g. for two liquid crystal arrays (a, b) at $\pm 45°$ followed by a polarizer and two more liquid arrays (c, d) at $\pm 45°$ the amplitude and the phase may be set by the first two arrays. In this exemplary case the polarization is determined by the last two arrays by writing the following phase retardance values ($\phi_c$, $\phi_d$) on the last two arrays.

$$\phi_c = \text{Re}\left(-i\ln\left[\frac{E_x + E_y}{E_{in}}\right]\right),$$

$$\phi_d = \text{Re}\left(-i\ln\left[\frac{E_x - E_y}{E_{in}}\right]\right)$$

with the ingoing field $E_{in}$, determined by the parameters P1, and the outgoing field components $E_x$ and $E_y$. All electric fields in this application are regarded as complex. The electric field is described as:

$$\vec{E} = \begin{pmatrix} E_x \\ E_y \end{pmatrix} = \begin{pmatrix} E_{xRe} + E_{xIm} \\ E_{yRe} + E_{yIm} \end{pmatrix}$$

with the real and imaginary laser field components $E_{xRe}$, $E_{yRe}$ and $E_{xIm}$, $E_{yIm}$, respectively.

For the unrestricted case of having at least four arrays a, b, c, e with suitable directions of optical axes and a polarizer in between one receives e.g. mathematically the phase retardances (for a polarizer after the second array and optical axes of +45°, −45°, 45°, 0°):

$$\phi_a = \pm\arccos\left(\frac{\sqrt{1+\frac{E_{xIm}^2}{E_{xRe}^2}}E_{xRe}\sqrt{1+\frac{E_{yIm}^2+E_{yRe}^2}{(E_{xIm}^2+E_{xRe}^2)g^2}}}{E_{in}}\right) - $$
$$\operatorname{arccot}\left(\frac{E_{xRe}}{E_{xIm}}\right) - \arctan\left(\frac{E_{yRe}}{E_{yIm}}\right),$$

$$\phi_b = \mp\arccos\left(\frac{\sqrt{1+\frac{E_{xIm}^2}{E_{xRe}^2}}E_{xRe}\sqrt{1+\frac{E_{yIm}^2+E_{yRe}^2}{(E_{xIm}^2+E_{xRe}^2)g^2}}}{E_{in}}\right) - $$
$$\operatorname{arccot}\left(\frac{E_{xRe}}{E_{xIm}}\right) - \arctan\left(\frac{E_{yRe}}{E_{yIm}}\right),$$

$$\phi_c = 2\operatorname{arccot}\left(\frac{E_{xRe}\sqrt{\frac{E_{xIm}^2+E_{xRe}^2}{E_{xRe}^2}}E_{yIm}\sqrt{\frac{E_{yIm}^2+E_{yRe}^2}{E_{yIm}^2}}g}{E_{yIm}^2+E_{yRe}^2}\right),$$

$$\phi_e = \operatorname{arccot}\left(\frac{E_{xRe}}{E_{xIm}}\right) + \arctan\left(\frac{E_{yRe}}{E_{yIm}}\right)$$

with the real and imaginary field parts and the grating correction value g describing the polarization dependent reflection.

For the practical case of having e.g. six arrays (a, b, c, d, e, f), a polarizer after the second array, and optical axes of +45°, −45°, +45°, −45°, 0°, 90° one receives:

$$\phi_a + \phi_b = \operatorname{arccot}\left(\frac{E_{xRe}}{E_{xIm}}\right) - \arctan\left(\frac{E_{yRe}}{E_{yIm}}\right),$$

$$\phi_a - \phi_b = \pm 2\arccos\left(\frac{\sqrt{1+\frac{E_{xIm}^2}{E_{xRe}^2}}E_{xRe}\sqrt{1+\frac{E_{yIm}^2+E_{yRe}^2}{(E_{xIm}^2+E_{xRe}^2)g^2}}}{E_{in}}\right),$$

$$\phi_c + \phi_d = \text{const.},$$

$$\phi_c - \phi_d = 2\operatorname{arccot}\left(\frac{E_{xFieldRe}\sqrt{\frac{E_{xIm}^2+E_{xRe}^2}{E_{xRe}^2}}E_{yIm}\sqrt{\frac{E_{yIm}^2+E_{yRe}^2}{E_{yIm}^2}}g}{E_{yIm}^2+E_{yRe}^2}\right),$$

$$\phi_e + \phi_f = \text{const.},$$

$$\phi_e - \phi_f = +\operatorname{arccot}\left(\frac{E_{xRe}}{E_{xIm}}\right) + \arctan\left(\frac{E_{yRe}}{E_{yIm}}\right)$$

Application of these phase retardances leads to predetermined laser pulse parameters in amplitude, phase, and polarization before the fiber. In a preferred embodiment the laser pulses constitute a predefined sub pulse sequence in amplitude, phase, and polarization. These laser pulses will then be transmitted through the optical fiber.

Inclusion of the parameters, which describe the optical fiber properties, is used in the calculation for the pulse shaper input values.

The optical influence due to the fiber properties (delays, phases, chirps, polarization state modification, etc.) have to be determined beforehand. The pre-compensating values for these properties have to be used by the pulse-former arrays.

The calculation method can be described in a general form including polarization dependent loss. Specifically favorable calculations are moreover presented for the two preferred embodiments of having a randomly directed birefringence along the fiber dimension or having an inherently birefringent optical fiber.

In the above mentioned unrestricted case of having at least four arrays one receives in general for the relation between the electrical fields at the proximal and distal end of the fiber:

$$\vec{E}_{Fiber-dist} = F \cdot \vec{E}_{Fiber-prox}$$

$$\vec{E}_{Fiber-prox} = F^{-1} \cdot \vec{E}_{Fiber-dist};$$

$$F = \begin{pmatrix} f_{xx} & f_{xy} \\ f_{yx} & f_{yy} \end{pmatrix}$$

with the fiber matrix F. According to (H. Hurwitz and R. C. Jones, JOSA 31, 493 (1941)) any optical system composed of retardation plates, partial polarizers, and rotators (equivalent to an optical fiber) can be replaced by four basic optical elements yielding the fiber parameters. The corresponding fiber matrix reads as a product of seven basic matrices:

$$J_{Fiber} = e^{i\phi} J_{Rot}(\alpha_1) \cdot J_{Ret}(\phi_1) \cdot J_{Rot}(\alpha_2) \cdot J_P(\sqrt{T}) \cdot J_{Rot}(\alpha_3) \cdot J_{Ret}(\phi_2) \cdot J_{Rot}(\alpha_4)$$

with the rotation, retardation and polarizer matrices $J_{Rot}$, $J_{Ret}$, and $J_P$, respectively, and the fiber parameters $\alpha_1$, $\alpha_2$, $\alpha_3$, $\alpha_4$, $\phi$, $\phi_1$, $\phi_2$, and T. These fiber parameters can be measured and hence the relation between the laser pulses at the proximal and distal fiber ends can in principle be determined.

This can be included into the above described calculation of the input modulation parameters for the unrestricted case and provides the general solution for receiving the shaped laser pulses at the distal end of the fiber. The solution can also be provided in one calculation step.

The laser field components $E_{xReFiber-dist}$, $E_{xImFiber-dist}$, $E_{yReFiber-dist}$ and $E_{yImFiber-dist}$ are thereby inscribed by the user. This can also be done in the temporal domain as a function of time since it is connected by Fourier transformation to the frequency representation. For intuitive input the corresponding pulse parameters (intensity I, phase $\phi$, ellipticity r=b/a with the principal axes a and b, major axis orientation $\gamma$, etc.) can be used. The electrical field can be inferred from these laser pulse parameters by:

$$\vec{E}_{Fiber-dist} = E_{in} \cdot \sqrt{I} \cdot \begin{pmatrix} \cos\left[\frac{1}{2}\arccos(\cos(2\gamma)\cos(2\arctan(r)))\right] \\ \exp[i\phi] \\ \sin\left[\frac{1}{2}\arccos(\cos(2\gamma)\cos(2\arctan(r)))\right] \\ \exp\left[i\left(\phi \pm \arctan\left(\frac{\tan(2\arctan(r))}{\sin(2\gamma)}\right)\right)\right] \end{pmatrix}$$

or in an equivalent form:

$$\vec{E}_{Fiber-dist} = E_{in} \cdot \sqrt{I} \cdot \begin{pmatrix} \sqrt{\frac{1}{2}(1-((r^2-1)/(r^2+1))\cos(2\gamma))}\exp[i\phi] \\ \sqrt{\frac{1}{2}(1+((r^2-1)/(r^2+1))\cos(2\gamma))} \\ \exp[i(\phi \pm \arccos[\operatorname{sgn}(\sin(2\gamma))\\ \sqrt{(r^2-1)^2/(1+r^4+r^2+r^2(\cot^2(\gamma)+\tan^2(\gamma))})] \end{pmatrix}$$

These equations can also be expressed as a function of time.

The electric field can be separated in real and imaginary parts for both components ($E_{xReFiber-dist}$, $E_{xImFiber-dist}$, $E_{yReFiber-dist}$ and $E_{yImFiber-dist}$) required for determination of liquid crystal phase retardances.

In the common case of having no polarization dependent fiber loss (e.g. as in the case of the random birefringent fiber) the fiber matrix can be described as a combination of three unitary matrices (H. Hurwitz and R. C. Jones, JOSA 31, 493 (1941)):

$$J_{Fiber} = e^{i\phi} J_{Rot}(\beta) \cdot J_{Ret}(\Delta\phi) \cdot J_{Rot}(\alpha)$$

$$J_{Fiber} = e^{i\phi} \begin{pmatrix} \cos(\beta) & -\sin(\beta) \\ \sin(\beta) & \cos(\beta) \end{pmatrix} \begin{pmatrix} e^{i\frac{\Delta\phi}{2}} & 0 \\ 0 & e^{-i\frac{\Delta\phi}{2}} \end{pmatrix} \begin{pmatrix} \cos(\alpha) & -\sin(\alpha) \\ \sin(\alpha) & \cos(\alpha) \end{pmatrix}$$

$$= e^{i\phi} \begin{pmatrix} e^{i\frac{\Delta\phi}{2}}\cos(\alpha)\cos(\beta) - e^{-i\frac{\Delta\phi}{2}}\sin(\alpha)\sin(\beta) & -e^{i\frac{\Delta\phi}{2}}\sin(\alpha)\cos(\beta) - e^{-i\frac{\Delta\phi}{2}}\cos(\alpha)\sin(\beta) \\ e^{i\frac{\Delta\phi}{2}}\cos(\alpha)\sin(\beta) + e^{-i\frac{\Delta\phi}{2}}\sin(\alpha)\cos(\beta) & -e^{i\frac{\Delta\phi}{2}}\sin(\alpha)\sin(\beta) + e^{-i\frac{\Delta\phi}{2}}\cos(\alpha)\cos(\beta) \end{pmatrix}$$

$$(J_{Fiber})^{-1} = e^{-i\phi} \begin{pmatrix} \cos(\alpha) & \sin(\alpha) \\ -\sin(\alpha) & \cos(\alpha) \end{pmatrix} \begin{pmatrix} e^{-i\frac{\Delta\phi}{2}} & 0 \\ 0 & e^{i\frac{\Delta\phi}{2}} \end{pmatrix} \begin{pmatrix} \cos(\beta) & \sin(\beta) \\ -\sin(\beta) & \cos(\beta) \end{pmatrix}$$

$$= e^{-i\phi} \begin{pmatrix} e^{i\frac{\Delta\phi}{2}}\sin(\alpha)\sin(\beta) - e^{-i\frac{\Delta\phi}{2}}\cos(\alpha)\cos(\beta) & e^{i\frac{\Delta\phi}{2}}\sin(\alpha)\cos(\beta) + e^{-i\frac{\Delta\phi}{2}}\cos(\alpha)\sin(\beta) \\ -e^{i\frac{\Delta\phi}{2}}\cos(\alpha)\sin(\beta) + e^{-i\frac{\Delta\phi}{2}}\sin(\alpha)\cos(\beta) & e^{i\frac{\Delta\phi}{2}}\cos(\alpha)\cos(\beta) - e^{-i\frac{\Delta\phi}{2}}\sin(\alpha)\sin(\beta) \end{pmatrix}$$

Hence, the relation between the electric fields at the proximal (E) and distal ($E_{Fiber-dist}$) end of the fiber is for this case:

$$\vec{E}_{Fiber-dist} = J_{Fiber}\vec{E}$$

$$= e^{i\phi} \begin{pmatrix} E_x\left(e^{i\frac{\Delta\phi}{2}}\cos(\alpha)\cos(\beta) - e^{-i\frac{\Delta\phi}{2}}\sin(\alpha)\sin(\beta)\right) + E_y\left(-e^{i\frac{\Delta\phi}{2}}\sin(\alpha)\cos(\beta) - e^{-i\frac{\Delta\phi}{2}}\cos(\alpha)\sin(\beta)\right) \\ E_x\left(e^{i\frac{\Delta\phi}{2}}\cos(\alpha)\sin(\beta) + e^{-i\frac{\Delta\phi}{2}}\sin(\alpha)\cos(\beta)\right) + E_y\left(-e^{i\frac{\Delta\phi}{2}}\sin(\alpha)\sin(\beta) + e^{-i\frac{\Delta\phi}{2}}\cos(\alpha)\cos(\beta)\right) \end{pmatrix}$$

$$\vec{E} = (J_{Fiber})^{-1}\vec{E}_{Fiber-dist}$$

$$= e^{-i\phi_{chirp}} \begin{pmatrix} E_{xFiber-dist}\left(e^{i\frac{\Delta\phi}{2}}\sin(\alpha)\sin(\beta) - e^{-i\frac{\Delta\phi}{2}}\cos(\alpha)\cos(\beta)\right) + E_{yFiber-dist}\left(e^{i\frac{\Delta\phi}{2}}\sin(\alpha)\cos(\beta) + e^{-i\frac{\Delta\phi}{2}}\cos(\alpha)\sin(\beta)\right) \\ E_{xFiber-dist}\left(-e^{i\frac{\Delta\phi}{2}}\cos(\alpha)\sin(\beta) - e^{-i\frac{\Delta\phi}{2}}\sin(\alpha)\cos(\beta)\right) + E_{yFiber-dist}\left(e^{i\frac{\Delta\phi}{2}}\cos(\alpha)\cos(\beta) - e^{-i\frac{\Delta\phi}{2}}\sin(\alpha)\sin(\beta)\right) \end{pmatrix}$$

$$E_{xRe} = (\cos(\phi_{chirp})E_{xReFiber-dist} + \sin(\phi_{chirp})E_{xIm-Fiber-dist})\left(-\cos\left(\frac{\Delta\phi}{2}\right)\cos(\alpha+\beta)\right) -$$
$$(\cos(\phi_{chirp})E_{xImFiber-dist} - \sin(\phi_{chirp})E_{xReFiber-dist})\left(\sin\left(\frac{\Delta\phi}{2}\right)\cos(\alpha-\beta)\right) +$$
$$(\cos(\phi_{chirp})E_{yReFiber-dist} + \sin(\phi_{chirp})E_{yImFiber-dist})\left(\cos\left(\frac{\Delta\phi}{2}\right)\sin(\alpha+\beta)\right) -$$
$$(\cos(\phi_{chirp})E_{yImFiber-dist} - \sin(\phi_{chirp})E_{yReFiber-dist})\left(\sin\left(\frac{\Delta\phi}{2}\right)\sin(\alpha-\beta)\right)$$

$$E_{xIm} = (\cos(\phi_{chirp})E_{xReFiber-dist} + \sin(\phi_{chirp})E_{xIm-Fiber-dist})\left(\sin\left(\frac{\Delta\phi}{2}\right)\cos(\alpha-\beta)\right) +$$
$$(\cos(\phi_{chirp})E_{xImFiber-dist} - \sin(\phi_{chirp})E_{xReFiber-dist})\left(-\cos\left(\frac{\Delta\phi}{2}\right)\cos(\alpha+\beta)\right) +$$
$$(\cos(\phi_{chirp})E_{yReFiber-dist} + \sin(\phi_{chirp})E_{yImFiber-dist})\left(\sin\left(\frac{\Delta\phi}{2}\right)\sin(\alpha-\beta)\right) +$$
$$(\cos(\phi_{chirp})E_{yImFiber-dist} - \sin(\phi_{chirp})E_{yReFiber-dist})\left(\cos\left(\frac{\Delta\phi}{2}\right)\sin(\alpha+\beta)\right)$$

$$E_{yRe} = (\cos(\phi_{chirp})E_{xReFiber-dist} + \sin(\phi_{chirp})E_{xIm-Fiber-dist})\left(-\cos\left(\frac{\Delta\phi}{2}\right)\sin(\alpha+\beta)\right) -$$
$$(\cos(\phi_{chirp})E_{xImFiber-dist} - \sin(\phi_{chirp})E_{xReFiber-dist})\left(\sin\left(\frac{\Delta\phi}{2}\right)\sin(\alpha-\beta)\right) +$$
$$(\cos(\phi_{chirp})E_{yReFiber-dist} + \sin(\phi_{chirp})E_{yImFiber-dist})\left(\cos\left(\frac{\Delta\phi}{2}\right)\cos(\alpha+\beta)\right) -$$
$$(\cos(\phi_{chirp})E_{yImFiber-dist} - \sin(\phi_{chirp})E_{yReFiber-dist})\left(\sin\left(\frac{\Delta\phi}{2}\right)\cos(\alpha-\beta)\right)$$

$$E_{yIm} = (\cos(\phi_{chirp})E_{xReFiber-dist} + \sin(\phi_{chirp})E_{xIm-Fiber-dist})\left(\sin\left(\frac{\Delta\phi}{2}\right)\sin(\alpha-\beta)\right) +$$
$$(\cos(\phi_{chirp})E_{xImFiber-dist} - \sin(\phi_{chirp})E_{xReFiber-dist})\left(-\cos\left(\frac{\Delta\phi}{2}\right)\sin(\alpha+\beta)\right) +$$
$$(\cos(\phi_{chirp})E_{yReFiber-dist} + \sin(\phi_{chirp})E_{yImFiber-dist})\left(\sin\left(\frac{\Delta\phi}{2}\right)\cos(\alpha-\beta)\right) +$$
$$(\cos(\phi_{chirp})E_{yImFiber-dist} - \sin(\phi_{chirp})E_{yReFiber-dist})\left(\cos\left(\frac{\Delta\phi}{2}\right)\cos(\alpha+\beta)\right)$$

The fiber parameters $\alpha, \beta, \phi$ and $\Delta\phi$ can be determined and included into the equations.

This can be included into the above described calculation of the input modulation parameters for the unrestricted case and provides the solution for receiving the shaped laser pulses at the distal end of the fiber.

The solution can also be provided in one calculation step.

Application of the in such way determined phase retardances as input modulator parameters leads to predetermined laser pulse parameters in amplitude, phase, and polarization after the fiber. This is valid for the randomly birefringent fiber. In a preferred embodiment the laser pulses constitute a predefined sub pulse sequence in amplitude, phase, and polarization.

For having a randomly directed birefringence along the fiber dimension one may preferably include the phase function and the polarization phase difference ($\phi_{Phasefkt}$, $\phi_{Pol}$) in the above stated restricted case by:

$$\phi_{aFiber} = \phi_a + \frac{\phi_{Phasefkt}}{2},$$

$$\phi_{bFiber} = \phi_b + \frac{\phi_{Phasefkt}}{2},$$

$$\phi_{cFiber} = \phi_c + \frac{\phi_{Pol}}{2},$$

$$\phi_{dFiber} = \phi_d - \frac{\phi_{Pol}}{2}$$

where $\phi_{aFiber}$, $\phi_{bFiber}$, $\phi_{cFiber}$ and $\phi_{dFiber}$ describe the required phase retardances including the optical fiber properties. Thereto, the polarization ellipse is turned, e.g. by a half wave plate, such that their principal axes match the perpendicular polarization component axes of the fiber.

A particularly favorable calculation method for having an inherently birefringent fiber is described in the following.

The influence of the fiber has to be determined for the two laser pulse components along the birefringent axes of the fiber having generally polarization dependent loss. I.e. the different group velocity dispersions, transmissions and phase difference in both components have to be measured before. These differently influencing properties have to be precompensated e.g. by applying different delays, transmissions, phases, and chirps of up to high order on the two corresponding laser pulse components.

The determined precompensation phase functions ($\phi_{Phasefkt1}$, $\phi_{Phasefkt2}$) transmissions ($T_1$, $T_2$) and phase difference ($\epsilon_{Pol}$) may be included in the calculation of the phase retardances of the liquid crystal arrays by applying on the one pulse component (1) parallel to the optical fiber axis:

$$E_{Fiber-1} = E_1 \cdot \sqrt{T_1} \cdot \exp[i\phi_{Phasefkt1}]$$

$$E_1 = E_{Fiber-1}/(\sqrt{T_1} \cdot \exp[i\phi_{Phasefkt1}])$$

and by applying on the other perpendicularly polarized pulse component (2):

$$E_{Fiber-2} = E_2 \cdot \sqrt{T_2} \cdot \exp[i(\phi_{Phasefkt2} \pm \epsilon_{Pol})]$$

$$E_2 = E_{Fiber-2}/(\sqrt{T_2} \cdot \exp[i(\phi_{Phasefkt2} \pm \epsilon_{Pol})])$$

The required electric fields at the proximal end of the fiber can be generated with the appropriate phase retardances of the liquid crystal arrays as described above. This can be conducted in the restricted or unrestricted case.

Application of these electric field components leads to predetermined laser pulse parameters in amplitude, phase, and polarization after the inherently birefringent fiber. In a preferred embodiment the laser pulses constitute a predefined sub pulse sequence in amplitude, phase, and polarization. This method particularly allows to create any polarization state in the light field at the distal end of the fiber even for the restricted case of having in the pulse shaping unit only one liquid crystal array (or only liquid crystal arrays with perpendicularly positioned optical axes) after the polarizer. It is realized by aligning the delays, phases, chirps, amplitudes, and phase differences between the two perpendicular laser pulse components.

Figure 7:
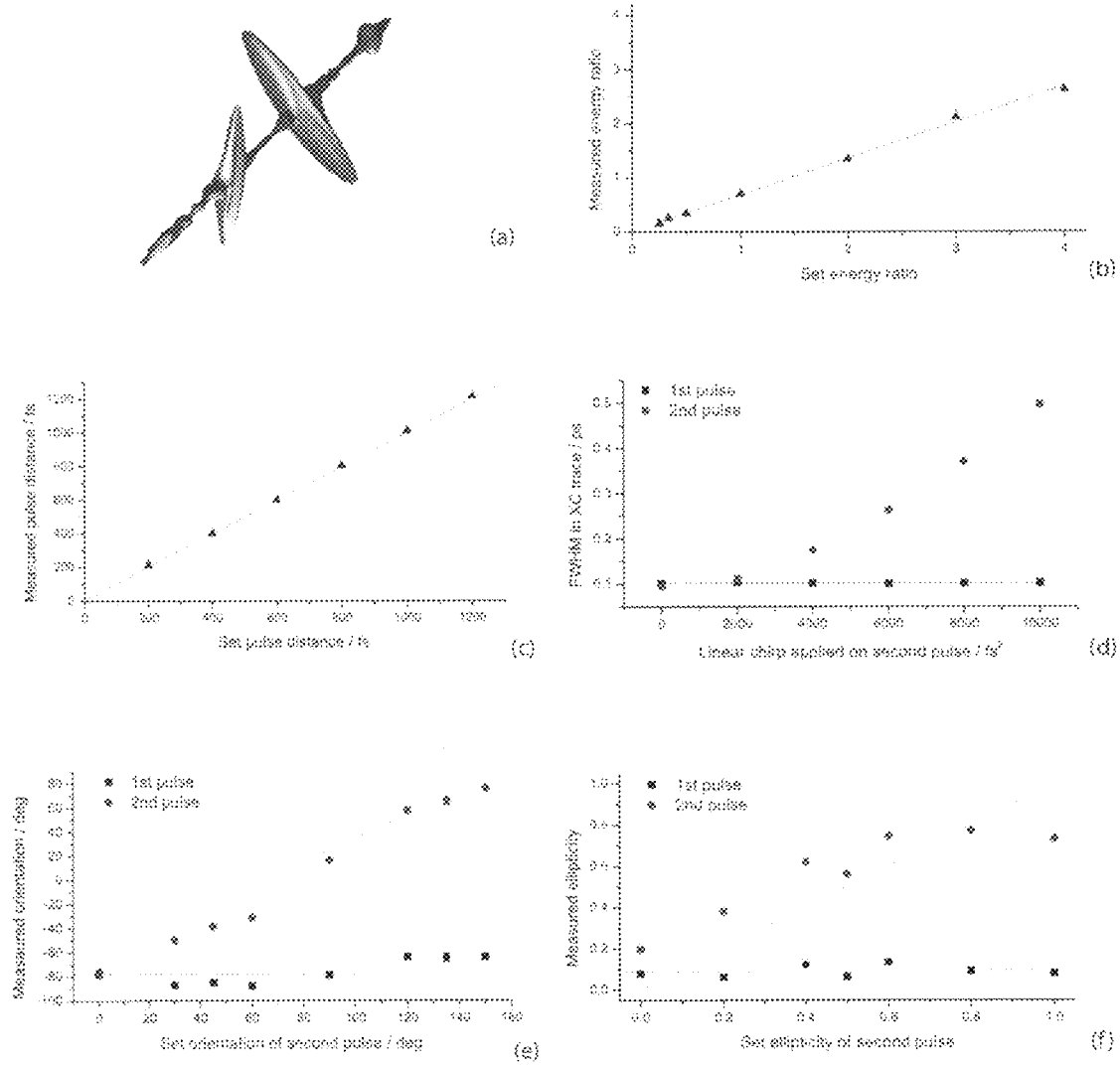
FIG. 7 shows the measured laser pulse shaping capabilities after a (hollow core) fiber. (a) 3D-representation of an example pulse with two linearly polarized sub pulses having a relative polarization orientation of 30° between them. (b) pulse energy ratio for two sub pulses. (c) distance between the two sub pulses. (d) sub pulse durations for applied chirp on the second sub pulse. (e) sub pulse orientations for varied orientation of the second sub pulse. (f) sub pulse ellipticities for variation of the second sub pulse ellipicity. The other pulse parameters remain constant in each case.

The measured laser pulse shaping capabilities after a (hollow core) fiber by applying the inventive pulse forming method are exemplarily presented in FIG. 7. A 3-dimensional representation of an example pulse with two linearly polarized sub pulses having a relative polarization orientation of 30° between them is shown in (a). The varied pulse energy ratio for the two sub pulses is presented in (b), and the distance between the two sub pulses is shown in (c). The sub pulse durations depending on the applied linear chirps for the second sub pulse are depicted in (d). The sub pulse orientations for varied orientation of the second sub pulse (e), and the sub pulse ellipticities for modification of the second sub pulse ellipicity (f) are moreover presented. The other parameters remain constant in each case. These systematic variations of the predetermined laser pulse parameters demonstrate the feasibility of the inventive pulse forming method.

The inventive pulse forming method may be applied for remote sensing methods, e.g. in production or chemical procedures. Moreover, control of the electro-magnetic near field after an optical fiber may be feasible (e.g. SNOM), where high temporal and spatial resolution (i.e. below the diffraction limit) can be achieved.

The inventive pulse forming method may be utilized for generating optical solitons and particularly vector solitons in optical fibers. At least one physical fiber parameter near the proximal part of the fiber may be taken into account for creating solitons in the fiber.

REFERENCE SIGNS

5 system for generating laser pulses
10 laser
20 pulse shaper
30 optical fiber
30' transmission system
30a proximal end
30b distal end
40 control unit
50 calculating module
60 storage
110 pulse shape measuring unit
200, 205 cylindrical lens
210, 215 grating
220, 225, 230 liquid crystal modulator
235 polarizer
240, 245 wave plate
300 reflection unit
400 optical fiber
400a proximal end
400b distal end
Pout, P1 laser pulses
Pin laser pulses
PP1, Pmod parameters for calculation module
Pf, PPin parameters for calculation module
Pref, PPref' parameters for calculation module
Sc control signal

LITERATURE

[1] A. M. Weiner, D. E. Leaird, J. S. Patel, J. R. Wullert, Opt. Lett. 15, 326 (1990)
[2] D. Goswami, Phys. Rep. 374, 385 (2003)
[3] R. S. Judson, H. Rabitz, Phys. Rev. Lett. 68, 1500 (1992)
[4] P. Nuernberger, G. Vogt, T. Brixner, G. Gerber, Phys. Chem. Chem. Phys. 9, 2470 (2007)
[5] T. Brixner, G. Gerber, Opt. Lett. 26, 557 (2001)
[6] T. Brixner, G. Krampert, T. Pfeifer, R. Selle, G. Gerber, M. Wollenhaupt, O. Graefe, C. Horn, D. Liese, T. Baumert, Phys. Rev. Lett. 92, 208301 (2004)
[7] T. Suzuki, S. Minemoto, T. Kanai, H. Sakai, Phys. Rev. Lett. 92, 133005 (2004)
[8] L. Polachek, D. Oron, Y. Silberberg, Opt. Lett. 31, 631 (2006)
[9] H. Miao, A. M. Weiner, L. Mirkin, P. J. Miller, Opt. Lett. 32, 2360 (2007)
[10] M. Plewicki, S. M. Weber, F. Weise, A. Lindinger, Appl. Phys. B 86, 259 (2007)

The invention claimed is:

1. A method of generating laser pulses having at least a predefined amplitude or phase or polarization at a distal end of an optical transmission system, the optical transmission system comprising at least one optical fiber, the method comprising the steps of:
   generating laser pulses and inputting the laser pulses into a pulse shaper to form modulated laser pulses having laser pulse energy;
   inputting the modulated laser pulses into a proximal end of the optical transmission system;
   reflecting at least a part of the laser pulse energy from the distal end of the optical transmission system back to the proximal end of the optical transmission system such that reflected laser pulses are formed;
   measuring the reflected laser pulses at the proximal end of the optical transmission system;
   calculating an amplitude value, phase value, polarization value, or combination thereof with respect to a current amplitude, phase, polarization, or combination thereof at the distal end of the optical transmission system, based on the measured reflected laser pulses at the proximal end of the optical transmission system;
   calculating a control signal for controlling the pulse shaper, wherein at least one physical parameter of the optical fiber and the calculated amplitude value, phase value, polarization value, or combination thereof are taken into account; and
   applying the control signal to the pulse shaper and modulating at least an amplitude or a phase or a polarization of the generated laser pulses such that said modulated laser pulses are formed with the predefined amplitude or phase or polarization.

2. The method of claim 1, wherein the amplitude, phase and polarization of the generated laser pulses are modulated.

3. The method of claim 1, wherein said step of calculating the control signal further takes the predefined amplitude, the predefined phase and the predefined polarization at the distal end of the optical transmission system into account.

4. The method of claim 1, wherein said step of calculating the control signal further takes parameters into account which describe a shaping behavior of the pulse shaper.

5. The method of claim 1, wherein said step of calculating the control signal further takes the amplitude, the phase, the polarization, or a combination thereof of the generated laser pulses, which are inputted into the pulse shaper, into account.

6. The method of claim 1, wherein at least one of the following steps is carried out:
   conducting a systematic modification of at least one predetermined laser pulse parameter; and
   generating a predetermined sub pulse sequence in amplitude, phase, polarization, or combination thereof.

7. The method of claim 1, wherein said step of calculating the control signal is adapted to an inherently birefringent optical fiber.

8. The method of claim 1, wherein said step of calculating the control signal is adapted to an optical fiber exhibiting randomly directed birefringence along its dimension.

9. The method of claim 1, wherein said step of calculating the control signal includes an iterative algorithm for reducing a difference between the predefined amplitude and the amplitude value, a difference between the predefined phase and the phase value, a difference between the predefined polarization and the polarization value, or combination thereof.

10. The method of claim 1, wherein the reflected laser pulses are transmitted on a same optical path as the modulated laser pulses on their way from the proximal end to the distal end of the optical transmission system.

11. The method of claim 1, wherein the optical transmission system further comprises at least one nonlinear element, which modifies or multiplies an optical frequency of the laser pulses, and wherein said step of calculating the control signal further takes parameters that describe a behavior of the at least one nonlinear element into account.

12. The method of claim 1, wherein the amplitude value, phase value, polarization value, or combination thereof are included into an iterative algorithm.

13. A system for generating laser pulses having a predefined amplitude, phase or polarization, the system comprising:
   a pulse shaper configured to modulate an amplitude, phase or polarization of incoming laser pulses and configured to form modulated laser pulses, said modulated laser pulses having energy;
   an optical transmission system connected to the pulse shaper, said optical transmission system comprising at least one optical fiber;
   a reflection unit at a distal end of the optical transmission system, said reflection unit being configured to reflect a part of the energy of the modulated laser pulses back to a proximal end of the optical transmission system;
   a pulse shape measuring unit configured to measure an amplitude, phase, polarization, shape, or combination thereof of the reflected laser pulses at the proximal end of the optical transmission system; and
   a control unit having a calculating module configured to provide for providing a control signal to control the pulse shaper,
   wherein said calculating module is configured to calculate an amplitude value, phase value, polarization value, or a combination thereof with respect to the current amplitude, phase, polarization, or a combination thereof at the distal end of the optical transmission system, based on the measured amplitude, phase, polarization, shape, or combination thereof of the reflected laser pulses at the proximal end of the optical transmission system, and
   wherein said calculating module is configured to take at least one physical parameter of the optical fiber and the calculated amplitude value, phase value, polarization value, or a combination thereof into account, and to generate a control signal which at least approximately leads to the predefined amplitude, phase or polarization at the distal end of the optical transmission system.

14. The system of claim 13, wherein said pulse shaper comprises at least one liquid crystal array in a spectrally dispersed laser beam path.

15. The system of claim 13, wherein said pulse shaper comprises at least three liquid crystal arrays which are arranged such that said incoming laser pulses pass the liquid crystal arrays, and wherein at least one polarizer is arranged between two of the three liquid crystal arrays.

16. The system of claim 13, wherein the optical transmission system forms or is a part of a medical device.

17. A computer program product, stored on a computer readable medium, comprising instructions for configuring a computer to calculate a control signal for controlling a pulse shaper according to the method as defined in claim 1.

* * * * *